Sept. 17, 1940.                H. GRIFFIN                2,214,901
                            POWER DRIVE CLUTCH
                           Filed June 26, 1937

INVENTOR.
HERBERT GRIFFIN
BY
Emery, Varney, Whittemore & Dix
ATTORNEYS.

UNITED STATES PATENT OFFICE 2,214,901

POWER DRIVE CLUTCH

Herbert Griffin, Jersey City, N. J., assignor to International Projector Corporation, New York, N. Y., a corporation of Delaware Application June 26, 1937, Serial No. 150,487

13 Claims. (Cl. 64—30)

This invention relates to power drive clutches. One of the features of the invention is the provision of a clutch which will allow a small amount of slippage at the start and which will allow slippage should the driven mechanism become clogged or jammed.

The invention, in one of its applications, is readily and advantageously included in apparatus which moves motion picture film therethrough. In particular the improved clutch is especially advantageous in apparatus for projecting sound motion pictures, and it will be in this type of installation that the description will be set forth in detail as an example.

In motion picture projection machines there are parts which have considerable starting inertia or friction. For example, the flywheel for the intermittent movement portion of the picture projection apparatus and the flywheel of the sound portion of the apparatus may interpose considerable resistance to starting. In order to operate the picture and sound mechanisms at a uniform speed it is customary to employ a synchronous motor. This type of motor develops full torque at the start, so it has also been proposed to use drive connections which would permit some slippage in starting, such as magnetic or other suitable forms of clutches. While such devices operate satisfactorily where picture projection alone is concerned, they do not bring the mechanism up to speed rapidly enough where sound reproduction is involved.

Figure 1:
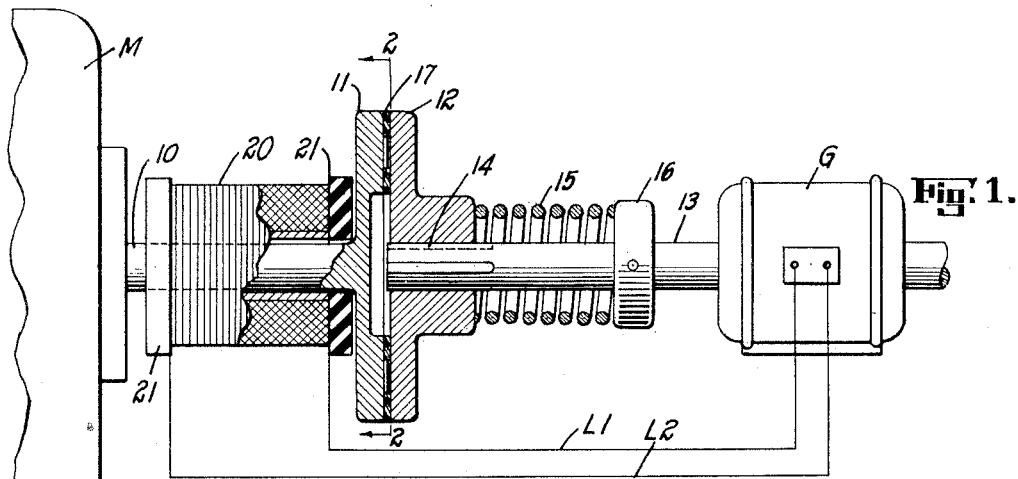
Fig. 1 is a side elevation of one form of mechanism constructed according to the invention.
Figure 2:
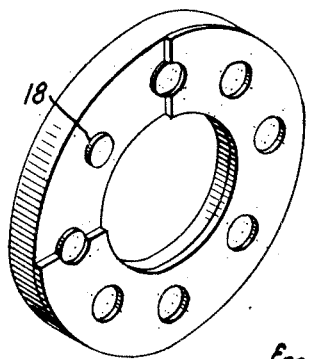
Fig. 2 is a transverse view taken on the line 2—2 of Fig. 1.

Referring to Figs. 1 and 2, showing the first form of apparatus embodying the invention, a drive motor M is provided with a shaft 10 upon which is mounted a driving clutch disk 11. The driving clutch disk 11 cooperates with a driven clutch disk 12 mounted on a driven shaft 13. The shaft 13 may be employed for driving the mechanism of the projection head of a motion picture projection machine. The term "projection head" as used herein includes both the picture projection head and the sound reproduction head or either, together with such accessories as are driven therewith.

One of the clutch disks, preferably the driven clutch disk 12 is mounted for movement from and toward the mating disk. As shown, the disk 12 is mounted on the driven shaft 13 through a splined connection 14 and is pressed toward the mating disk 11 by a coil spring 15 acting against a collar or flange 16 secured to the shaft. The tension of the spring 15 may be adjusted in any suitable manner as by changing the position of the collar 16 along the shaft.

A sheet of friction material 17 may be secured to either or both disks 11 and 12 or may be independently mounted between them. Preferably the friction material, such as fibre or any other suitable substance, is mounted on the face of the driving disk 11. As shown in Fig. 2, it may be mounted upon a plurality of spaced projections 18 carried on the face of the disk. The projections are short enough to be disposed behind the face of the friction material so as to avoid contact between the projections and the face of the mating clutch disk. The use of this sheet of friction material will also prevent the clutch disks from sticking together as they might if placed directly together.

As thus far described the clutch would function as a resilient friction slip clutch to transmit a driving torque from the motor drive shaft 10 to the driven shaft 13 and would gradually accelerate the driven shaft until it reached the speed of the motor shaft. However, it is desired, on account of the fact that the sound reproducing mechanism demands rapid acceleration, to impart to the driven shaft more rapid acceleration than the resilient friction slip clutch is capable of producing. For this purpose supplemental clutch engaging mechanism is provided. Preferably this supplemental mechanism is of such a nature as to impart an increasing clutching action as the speed of the driven shaft increases until the driving and driven shafts are substantially locked together. This may be described as a compound or self-induced increase in clutching action.

As shown in Fig. 1, this supplemental clutch-engaging mechanism comprises an electro-magnet which includes a coil 20 and insulation ends 21 on the motor shaft 10 adjacent the driving clutch disk 11 which is responsive to magnetic forces. The coil may be associated with the shaft 10 or the disk 11 in any suitable manner and may be mounted stationary as shown or may rotate with the shaft 10. If the magnetic device rotates with the shaft, suitable brushes and rings may be provided for establishing electrical connection to the coil. The driving disk 11 will be considered as a part of the core of the magnet and will be suitably formed of proper material for this purpose. The driven disk will constitute the armature of the magnet and will be suitably formed of proper material for this purpose.

Current is supplied to the coil of the magnet as a function of the speed of the driven shaft 13. In the form shown in Fig. 1 this is accomplished by driving a small magnet-exciting generator G by the driven shaft 13 and this generator is connected by suitable leads L1, L2 and connections with the magnet coil 20.

Figure 3:
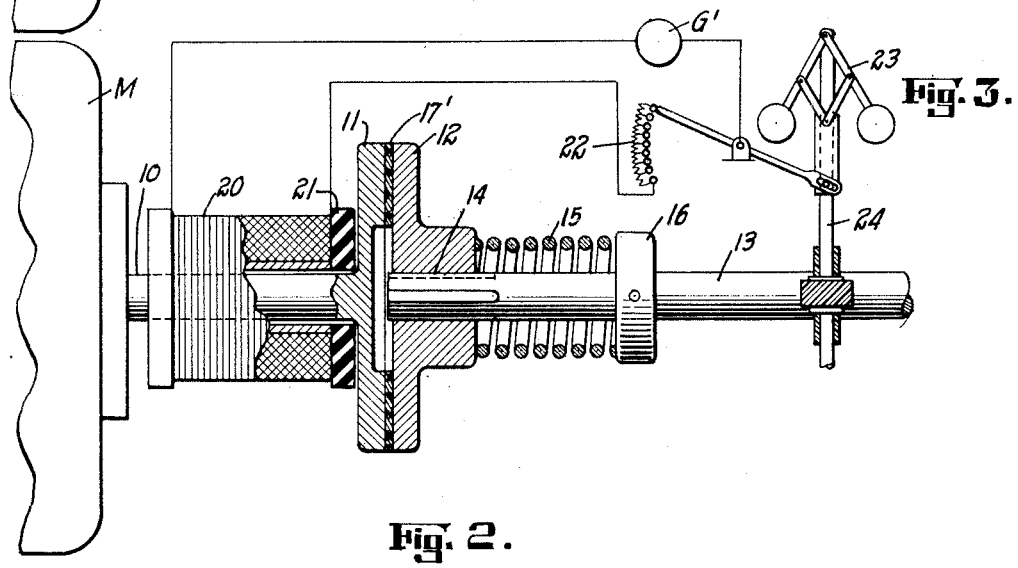
Fig. 3 is a side elevation of another form of mechanism constructed according to the invention.

In the form shown in Fig. 3 the current to the magnet is supplied from an external source as from a power line or a generator G' and the amount of current supplied to the coil 20 is regulated by a variable resistance switch or rheostat 22 operated by a centrifugal governor 23 mounted on a governor shaft 24 driven from the shaft 13.

The Fig. 3 form otherwise departs from the Fig. 1 form only in the omission of the projections 18 on the driving disk 11. In the Fig. 3 form the friction material 17' is secured to the disk by rivets or any other suitable means. It will be understood that when the projections are used they are beneficial in providing a close relationship for a considerable portion of the disk 11 with the disk 12 so that the magnetic lines of force have only small gaps to pass between the disks.

In operation, the motor M, immediately upon starting, transmits a driving torque to the driven shaft 13 through the spring-induced engagement of the clutch plates. Some slippage of the clutch will occur but the shaft 13 rapidly accelerates and as it does it causes generated current to flow in increasing amounts to the magnet coil. In the Fig. 1 form this is caused by the increasing speed of the generator G; and in the Fig. 2 form it is accomplished by decreasing the resistance in the current supply line by the action of the centrifugal governor. The increasing current in the magnet coil produces stronger engagement of the clutch disks and this in turn produces more rapid movement of the driven shaft until very shortly the driving and driven shafts are substantially locked together. However, if the speed of the driven shaft should be decreased on account of binding of the projection mechanism or for any other reason the clutch will slip enough to prevent damage and the current supply to the magnet will be decreased to permit still easier slippage of the clutch.

It will thus be seen that the invention provides an improved driving connection which will produce very rapid acceleration of the driven mechanism but which will permit slippage to prevent breakage and undue strain on the parts either in starting or in case the driven mechanism encounters undue resistance to movement during operation. In either case, whether accelerating or decelerating, the action is compounded or self-induced as a function of the movement of the driven parts so as to produce very rapid effects. The use of friction material between the clutch disks provides efficient smooth engagement yet permits slip when required and prevents the clutch disks from sticking or freezing together when current on the magnet is cut off.

While the invention has been described as being peculiarly suited for use with motion picture projection apparatus, it may, in certain aspects at least, find other uses. Also while certain exemplary embodiments of the invention have been illustrated and described, the invention may have other embodiments within the limits of the prior art and the scope of the subjoined claims.

I claim:

1. Apparatus of the character described, comprising in combination, a driving shaft, a driven shaft, a slip clutch between said shafts, means constantly acting to engage said clutch, a generator driven by the driven shaft and supplemental magnetic means controlled by said generator for acting upon said clutch to vary the action thereof as a function of the speed of the driven shaft.

2. Apparatus of the character described, comprising in combination, a driving shaft, a driven shaft, a slip clutch between said shafts, means constantly acting upon said clutch with uniform pressure, a generator driven by the driven shaft and supplemental magnetic means controlled by said generator for applying increased pressure on said clutch as the speed of the driven shaft increases.

3. Apparatus of the character described, comprising in combination, a driving shaft, a driven shaft, a slip clutch between said shafts, resilient means constantly acting upon said clutch, means for adjusting the pressure exerted by said resilient means, a generator driven by the driven shaft and supplemental magnetic means controlled by said generator for applying variable pressure on said clutch as a function of the speed of said driven shaft.

4. Apparatus of the character described, comprising in combination, a driving shaft, a driven shaft, a slip clutch between said shafts, spring means for actuating said clutch, a generator driven by the driven shaft and electro-magnetic means controlled by the speed of said generator for applying variable supplemental pressure upon said clutch.

5. A power connection, comprising in combination, a driving shaft, a driven shaft, a driving clutch member secured to said driving shaft, a driven clutch member secured to said driven shaft, resilient means constantly urging said clutch members together, an electro-magnetic device associated with said clutch members for supplementing the action of said resilient means, and means operated by said driven shaft for controlling the action of said electro-magnetic device.

6. A power connection, comprising in combination, a driving shaft, a driven shaft, a driving clutch member secured to said driving shaft, a driven clutch member secured to said driven shaft, resilient means constantly urging said clutch members together, an electro-magnetic device associated with said clutch members for supplementing the action of said resilient means, and a generator operated by said driven shaft for supplying current to said magnetic device for controlling the clutching effect produced thereby in accordance with the speed of said driven shaft.

7. A power connection, comprising in combination, a driving shaft, a driven shaft, a driving clutch member secured to said driving shaft, a driven clutch member secured to said driven shaft, resilient means constantly urging said clutch members together, an electro-magnetic device associated with said clutch members for supplementing the action of said resilient means, a source of current supply for said electro-magnetic device, and a speed controlled rheostat operated by said driven shaft for supplying current to said electro-magnetic device.

8. A magnetic clutch device, comprising in combination, a pair of cooperating clutch disks, resilient means constantly urging said clutch members together, means to exert a magnetic force to draw said disks together, friction material on the face of one of said disks, and spaced projections on the face of the disk which carries said friction material, said spaced projections extending partly through apertures formed in said friction material for the purposes set forth.

9. Drive mechanism for motion picture apparatus having picture projection and sound reproduction devices, comprising in combination, a driving shaft, a driven shaft for operating the picture projection and sound reproduction devices, a synchronous motor for operating said driving shaft, a slip clutch connecting said shafts, means constantly urging said clutch into engagement, a generator driven by the driven shaft and magnetic means controlled by the speed of said generator for varying the force of engagement of said clutch.

10. Drive mechanism for motion picture apparatus, comprising in combination, a driving shaft carrying a driving clutch member, a driven shaft, a driven clutch member slidably mounted on said driven shaft for movement from and toward said driving clutch member, friction facing material on one of said clutch members for co-acting with the other clutch member, resilient means constantly forcing said slidable driven clutch member toward the driving clutch member, means for adjusting the tension of said resilient means, electro-magnetic means for exerting a supplemental force of engagement between said clutch members, and means controlled by the speed of said driven shaft for varying the effect produced on the clutch by said electro-magnetic device.

11. In combination, a driving clutch member, a driven clutch member, spring means to move one of said members into clutch engagement with the other member, a generator operatively connected to one of said clutch members and an electro magnet in circuit with said generator to assist the action of said spring means.

12. In combination, a driving clutch member, a driven clutch member, spring means to move one of said members into clutch engagement with the other member, electro magnetic means to assist the action of said spring means and means to increase the strength of said electro magnetic means in direct proportion to the rate of rotation of said driven clutch member.

13. In combination, a drive shaft, a driving clutch member fixed to said shaft, a driven shaft, a driven clutch member splined to said driven shaft, spring means tending to move said driven clutch member into frictional contact with the driving clutch member, a magnetic coil to assist the action of said spring means and means to govern the intensity of the magnetic forces in said coil dependent upon the rate of rotation of said driven shaft.

HERBERT GRIFFIN.